United States Patent
Prieto et al.

(10) Patent No.: US 9,759,253 B2
(45) Date of Patent: Sep. 12, 2017

(54) METHOD FOR CRACKING A CONNECTING ROD

(71) Applicant: GAINDU, S.L., Elgoibar, Guipuzcoa (ES)

(72) Inventors: Gorka Prieto, Guipuzcoa (ES); Javier Pena, Guipuzcoa (ES)

(73) Assignee: GAINDU, S.L., Elgoibar (Guipuzcoa) (ES)

( * ) Notice: Subject to any disclaimer, the term of this patent is extended or adjusted under 35 U.S.C. 154(b) by 0 days.

(21) Appl. No.: 15/192,709

(22) Filed: Jun. 24, 2016

(65) Prior Publication Data
US 2016/0305472 A1 Oct. 20, 2016

Related U.S. Application Data

(62) Division of application No. 14/283,011, filed on May 20, 2014, now Pat. No. 9,403,223.

(30) Foreign Application Priority Data

May 24, 2013 (EP) .................................... 13382192

(51) Int. Cl.
*B23P 17/00* (2006.01)
*F16C 9/04* (2006.01)
*B23D 31/00* (2006.01)

(52) U.S. Cl.
CPC ............ *F16C 9/045* (2013.01); *B23D 31/002* (2013.01); *B23D 31/003* (2013.01);
(Continued)

(58) Field of Classification Search
CPC ........... Y10T 225/371; Y10T 29/49218; Y10T 29/49288; Y10T 477/6933; Y10T 74/19251; B23D 31/002; B01D 2221/08
(Continued)

(56) References Cited

U.S. PATENT DOCUMENTS 4,768,694 A * 9/1988 Fabris .................. B23D 31/003
225/100
5,263,622 A * 11/1993 Henzler ............... B23D 31/003
225/100
(Continued)

FOREIGN PATENT DOCUMENTS

DE 198 41 027 C1 3/2000
EP 2 749 368 A1 7/2014
WO WO 2013/034782 3/2013

OTHER PUBLICATIONS

European Search Report, Application No. 14169046.1, Gaindu, S.L. European Patent Office, Oct. 27, 2014, 8 pages.

*Primary Examiner* — Thiem Phan

(57) ABSTRACT

The machine for cracking a connecting rod comprises an electro press with an electric motor (400) for actuating an expandable element. The electro press comprises a first S actuator part (410) and a second actuator part (430) arranged so that when the first actuator part is driven by the electric motor (400) from a first position to a second position, (a) the first actuator part (410) is first driven by the electric motor (400) from said first position (FIG. 12A) to an intermediate position (FIG. 12B), without displacing the second actuator part (430), and (b) subsequently the first actuator part (410) is further driven by the electric motor (400) from said intermediate position (FIG. 12B) to said second position (FIG. 12C), displacing the second actuator part from a non-expanding position to an expanding position.

20 Claims, 18 Drawing Sheets

(52) U.S. Cl.
CPC .... *Y10T 29/49218* (2015.01); *Y10T 29/49288* (2015.01); *Y10T 225/371* (2015.04)

(58) Field of Classification Search
USPC ... 29/882, 239, 413, 416, 426.4, 426.5, 711, 29/762, 770, 791, 821, 888.09, 888.092, 29/DIG. 46; 225/1, 97, 101, 103, 104, 225/105
See application file for complete search history.

(56) References Cited

U.S. PATENT DOCUMENTS 6,571,999 B2    6/2003  Hase
8,302,271 B2   11/2012  Hashimoto \* cited by examiner

METHOD FOR CRACKING A CONNECTING ROD

CROSS REFERENCE TO RELATED APPLICATIONS

This application is a division of application serial number U.S. Ser. No. 14/283,011 filed May 20, 2014 for MACHINE AND METHOD FOR CRACKING A CONNECTING ROD.

FIELD OF THE INVENTION

The invention is related to machines and methods for the production of connecting rods (also known as conrods), and especially to the machines for performing cracking of the big end of the rods, and related actions.

DESCRIPTION OF RELATED ART

In internal combustion engines for automobiles, the connecting rod is used to connect the piston to the crankshaft. The connecting rods are usually made of metal, such as steel, although also other materials can be used, for example, to achieve a desired lightness. A connecting rod typically has a small end with a small bore, and a big end with a big bore. The small end attaches to the piston pin or similar, and, the big end typically connects to the crankshaft.

FIG. 1 illustrates a typical design of a connecting rod. The connecting rod 1000 comprises what will hereinafter be referred to as a rod portion or rod 1001 (comprising the stem portion 1004 and the small end 1003 in which the small bore 1005 is formed, as well as part of the big end in which the big bore 1006 is formed), and a cap 1002 which, together with the big end of the rod 1001, defines the big bore 1006. The cap 1002 is attached to the rod by screws 1007 which are screwed into corresponding bores. The joint 1008 between rod 1001 and cap 1002 is often hardly visible on the finished rod.

The connecting rod is obtained by machining a blank in the form of a single metal piece so as to produce a rod blank comprising both the small end with the small bore and the big end with the big bore. This rod blank is subsequently split into the rod 1001 and the cap 1002. This operation is normally referred to as "cracking" of the rod, an operation which is normally performed by Introducing an object, such as two expander mandrel parts, into the big bore 1006, and separating these two mandrel parts using, for example, a wedge element. Before performing the actual cracking, the big end has been "notched" by, for example, laser or other suitable means, so as to establish notches that define the plane where the big end will split during separation of the two expander mandrel parts.

Due to the fact that the cap 1002 and rod 1001 are separated from each other by actually "cracking" the metal (instead of, for example, by cutting or other means, or instead of producing rod and cap from two separate blanks), the surfaces where rod and cap are connected to each other fit very well together, once the rod and cap have been reassembled to form the connecting rod.

Cracking rod blanks is conventional in the art of manufacture of connecting rods.

For example, DE-19841027-C1 describes a machine used for cracking rods. A laser is used to produce the notches that define the plane of cracking. Cracking is performed by using what appears to be two expander mandrel halves, which expand due to the movement of a wedge element. The machine further comprises means for screwing the cap onto the rod.

U.S. Pat. No. 6,457,621-81 teaches a device for separating rod and cap of a connecting rod, by means of cracking the big end using two expander mandrel halves and a cleaving wedge. The device comprises a fixed device half and a movable device half U.S. Pat. No. 6,457,621-81 describes extensively how the rod blank can be fixed in its position during the operation.

Also DE-9320463-U1, EP-568119-A1 and EP-467198-A1 describe different arrangements for cracking connecting rods.

U.S. Pat. No. 6,671,955-81 describes a method for treating a connecting rod after cracking, by applying a vibration treatment. The crack surfaces are in contact during the vibration treatment.

Generally, the expandable element used for cracking the big end, such as an expandable element comprising two expander mandrel halves, is actuated by mechanical plungers and, more frequently, by hydraulic systems. The hydraulic systems have been considered to work well and to be generally reliable. However, it is considered that hydraulic systems may involve certain disadvantages. For example, they are not always as clean as one might desire, and it is believed that the stability and control of the processes may be far from perfect. Also, hydraulic systems require sensors to verify speed, force, position, etc. Also, the operation of a machine with hydraulic actuators may depend on external factors such as temperature. The operation of a hydraulic system can, to a large extent, be influenced by temperature, as this influences the viscosity of the fluid of the system. Thus, performance can vary with temperature. Also, at least in some known arrangements, the energy consumption of hydraulic or pneumatic systems can be rather high.

US-2005/0044706-A1 teaches the use of a stepping motor combined with a guide or cam device to actuate an expanding element for cracking the big end of a connecting rod. A wedge is displaced in the vertical direction depending on the position of pair of rollers on a guide having upper and lower cam surfaces. Different portions of the upper and lower surfaces of the guide are placed at different levels, whereby the guide, when correctly dimensioned, makes it possible to very precisely move the wedge between different positions, in the vertical direction. Thus, it is possible to obtain a very precise displacement of the wedge in the vertical direction, even when using a rather simple and non-expensive stepping motor.

A drawback with the system disclosed in US-2005/0044706-A1 is that the different positions of the wedge in the vertical direction are determined by the shape of the guide. Thus, in order to modify the displacement of the wedge in the vertical direction, for example, to modify the amplitude of the displacement, it is necessary to replace the guide by a different guide. Thus, adaptation of the way in which the wedge is displaced, for example, in order to improve the cracking process or to adapt the machine to a different kind of connecting rod, is a complex task requiring the intervention of an operator to replace the guide.

WO-2013/034782-A1 teaches a different approach, based on the use of an electro press with a servomotor for actuating the expandable element. An electro press with a servomotor, which can be easily and reliably controlled by software, provides for flexibility and reliability. Parameters such as force, speed, position, etc., can be easily controlled. An electro press actuated by a servomotor can typically operate with a repeatability in the order of +/−0.005 mm. This degree of repeatability can reduce the need to perform calibrations when adapting the machine to, for example, crack a new kind of connecting rod. The way in which the electro press works, for example, in what regards displacements and speeds, can be easily modified by adapting the software used to control the servomotor, for example, by switching between a set of instructions used for one kind of connecting rod to a set of instructions suitable for another kind of connecting rod. Thus, contrarily to what is the case with the arrangement taught by U.S. Pat. No. 2005/0044706-A1, the electro press with the servomotor taught by WO-2013/034782·A1 can be adapted to different kinds of connecting rods merely by adapting the software used to control the servomotor, and without any need for complex changes to hardware.

SUMMARY OF THE INVENTION

A first aspect of the invention relates to a machine or apparatus for cracking a connecting rod having a small end and a big end, into a rod part and a cap part. The machine comprises:

positioning elements for positioning said connecting rod in a position for cracking;

an expandable element arranged to be inserted into a bore in said big end of the connecting rod so as to allow for splitting of said connecting rod into said rod part and said cap part by expanding said expandable element; and an electro press comprising an electric motor, for example, a servomotor, for actuating the expandable element.

The electro press comprises a first actuator part arranged to be driven by said electric motor between a first position and a second position. The machine further comprises a second actuator part arranged to be driven by said first actuator part between a non-expanding or initial position in which it does not produce expansion of said expandable element, and an expanding or final position in which it produces expansion of said expandable element.

In accordance with the invention, the first actuator part and the second actuator part are arranged so that when the first actuator part is driven by the electric motor from said first position to said second position, (a) the first actuator part is first driven by the electric motor from said first position to an intermediate position without displacing the second actuator part, and (b) subsequently the first actuator part is further driven by the electric motor from said intermediate position to said second position, displacing the second actuator part from the non-expanding position to the expanding position.

Thus, when driven from said first position to said intermediate position, the first actuator part does not displace the second actuator part and does not lose momentum, speed or energy due to power needed to produce the displacement of the second actuator part, which produces the expansion of the expanding element. Thus, during this first stage when the first actuator part is driven from the first position to the intermediate position, the electric motor can accelerate the first actuator part so as to make it reach a desired speed and momentum and/or to accumulate a desired amount of kinetic energy, without spending power on expanding the expandable element. Once the first actuator part has reached the desired speed, the first actuator part can interact with the second actuator part so as to displace it, producing the expansion of the expandable element. It has been found that thereby, it is possible to improve the quality of the cracking process, and obtaining an efficient and high quality cracking or splitting of the connecting rod, for example, without any need for an oversized motor.

In the art of cracking of connection rods, the rods are generally cracked at two diametrically opposed positions at the big end of the rod. Normally, the rod cracks first at one of these positions, and later at the other one (as illustrated in, for example, FIG. 7 of US 2002/0023939-A1 and FIG. 13 of US 2005/0044706-A1, illustrating how the first fracture takes place shortly before the second fracture). To reduce the risk for undesired deformations of the rod portions in the areas adjacent to the cracks, it is desired that the time between the two fractures be small and that the cracking be carried out rapidly. It has been found that by letting the motor accelerate a first actuator part before starting to move the second actuator part can be helpful to shorten the time between the two fractures, and to reduce the risk for non-desired deformations, by reducing the time between the start of the expansion of the expandable element and the time when the second fracture has taken place, thereby completing the cracking of the connecting rod. By means of this two-step process, the motor can first accelerate the first actuator part to a desired speed without this acceleration being hindered by the interaction between the second actuator part and the expandable element, and thereafter the speed and momentum of the first actuator part, supported by the motor, is used to achieve a rapid cracking.

In some embodiments of the invention, said first actuator part and said second actuator part are arranged in relation to each other so that the first actuator part is axially displaceable with regard to said second actuator part to an extent corresponding to the distance between said first position and said intermediate position. That is, a kind of telescopic or similar arrangement can be used, where the first actuator part and the second actuator part make up an assembly allowing for a certain degree of movement between these two parts. Thus, when returning from the second position, the first actuator part can drag the second actuator part back to its initial position.

In some embodiments of the invention, said first actuator part and said second actuator part are arranged so that one of said actuator parts has a portion arranged within a portion of the other actuator part so that said one of said actuator parts is retained within said other actuator part, and moveable, such as axially moveable, with regard to said other actuator part to an extent corresponding to the distance between said first position and said intermediate position. That is, an assembly is achieved with possibility of movement that allows, on the one hand, for acceleration of the first actuator part without being hindered by the second actuator part. Due to the fact that the two actuator part are retained one within the other, when the first actuator part returns to its original position, it drags the second actuator part to the intermediate position, thereby placing it in a position ready to initiate a further cracking operation.

In some embodiments of the invention, an end portion of said first actuator part is retained within a retaining portion of said second actuator part. Such an end portion can have a larger diameter than an adjacent portion of said first actuator part, and/or lateral projections, so as to remain retained.

In some embodiments of the invention, said end portion of said first actuator part is displaceable, within said retaining portion of said second actuator part, a distance corresponding to the distance between said first position and said intermediate position.

In some embodiments of the invention, said first actuator part is arranged to impact on said second actuator part when said first actuator part reaches said intermediate position from said first position. Thus, a hammer-like impact or similar can be achieved, allowing for a prompt cracking of the connecting rod. In some embodiments of the invention, the first actuator part is placed above the second actuator part so that when said first actuator part reaches said intermediate position coming from said first position, and end portion of said first actuator part impacts on an end portion or other portion of said second actuator part, thus applying a downward thrust on said second actuator part. It has been found that this kind of arrangement is easy to implement and works in in a reliable manner. For example, the mating portions can be blunt or otherwise arranged to support a large number of impacts without suffering excessive wear.

In some embodiments of the invention, the first actuator part is arranged to be displaced in the vertical direction between said first position and said second position, by a spindle arranged to be rotated by said electric motor. For example, said first actuator part can be attached to a carriage which is coupled to said spindle so that the carriage is displaced vertically in accordance with the rotation of the spindle by the electric motor. Hereby, a simple and compact arrangement is obtained. In some embodiments of the invention, the spindle is arranged in parallel with an output shaft of the electric motor, whereby a transmission means is interconnecting said output shaft and said spindle so that rotation of said output shaft causes rotation of the spindle. This arrangement of motor shaft and spindle in parallel has proven to be appropriate and allows for a compact construction of the machine.

In some embodiments of the invention, the expandable element comprises expander mandrel halves arranged to be separated by a wedge element, said second actuator part comprising said wedge element.

In some embodiments of the invention, said electric motor and said first actuator part are arranged so that said electric motor first accelerates said first actuator part until it reaches a predetermined velocity, and thereafter maintains said first actuator part moving substantially at said predetermined velocity, the machine being configured so that cracking of the connecting rod by a first fracture and a second fracture takes place while said first actuator part is moving substantially at said predetermined velocity. For example, the first actuator part can start to displace said second actuator part after it has reached this predetermined velocity, so that the entire expansion of the expandable element takes place while said first actuator part is moving at this substantially constant, predetermined velocity. Obviously, minor variations in said velocity can occur, but the deviations from the predetermined velocity during this interval are preferably less than 10%, more preferably less than 5% and even more preferably less than 2% or 1%. Keeping the actuator parts moving at a substantially constant and predetermined velocity during the cracking process, including at least a point of time before the first fracture and a point of time after the second fracture, and preferably including the entire stage of expansion of the expanding element until after the second fracture, has been found useful to make sure that cracking of subsequent connecting rods can be carried out in the same way, that is, it contributes to the repeatability of the process and to guarantee quality and similarity between subsequently produced products. It is considered practical for most sizes and kinds of connecting rods for internal combustion vehicles, such as cars and trucks, that this predetermined velocity is substantially maintained for a couple of cm of movement of the first actuator part, for example, for more than 1, 2 or 3 cm, but for less than 15, 10, 8, 6, 5 or 4 cm, such as for more than 2 but less than 10 cm. The substantially constant velocity should preferably be maintained for a sufficient distance to make sure that the relevant part of the cracking process, including the first and second fracture and part or all of the expansion of the expanding element, will take place while the first actuator part and optionally also the second actuator part are displaced at substantially the predetermined velocity. However, moving the actuator part at the predetermined velocity over an excessive distance would not contribute to quality but merely to wear and unnecessary use of energy.

In some embodiments of the invention, the electric motor is a servomotor. The servomotor can be controlled by software, and trial and error tests can conveniently be performed by adapting the software until it is found that the connecting rods are cracked in a reliable and repeatable manner. For example, the software can be adapted to make sure that the first actuator part reaches a programmed and predetermined velocity and thereafter is kept at this velocity during the cracking process, as explained above.

A second aspect of the invention relates to a method of cracking a connecting rod having a small end and a big end, into a rod part and a cap part, using a machine according to the first aspect of the invention. The method comprises the steps of:

operating the electric motor to accelerate the first actuator part while displacing said first actuator part from said first position to said intermediate position; and thereafter, further operating the electric motor to drive the first actuator part to said second position so that said first actuator part displaces said second actuator part from the non-expanding or initial position to the expanding position to expand the expandable element to crack the connecting rod into said rod part and said cap part.

Of course, it is not necessary that acceleration takes place during the entire displacement from the first position to the intermediate position, for example, in some embodiments of the invention, the first actuator part reaches its desired and predetermined velocity before reaching said intermediate position.

In some embodiments of the invention, the electric motor is operated to first accelerate the first actuator part until it reaches a predetermined velocity, and the electric motor is thereafter operated to maintain said first actuator part moving substantially at said predetermined velocity until after cracking of the connecting rod by a first fracture and a second fracture. For example, the first actuator part can arrive at said first velocity before it starts to displace the second actuator part, so that both of said actuator parts are driven at the substantially constant and predetermined velocity during the cracking process, including the stage of expansion of the expandable element until after completion of the cracking of the connecting rod by the two fractures. A substantially constant velocity preferably implies deviations by less than 10%, 5%, 2% or 1%, from the predetermined velocity value. The acceleration and maintenance of the velocity can be achieved by adequate programming of a control unit that controls the electric motor.

In some embodiments of the invention, the method further comprises the step of operating the electric motor to displace the first actuator part from said second position back to said first position, using said first actuator part to drag said second actuator part from said expanding position to said non-expanding or initial position.

A third aspect of the invention relates to a method of cracking a connecting rod having a small end and a big end, into a rod part and a cap part, using a machine comprising:

positioning elements for positioning said connecting rod in a position for cracking;

an expandable element arranged to be inserted into a bore in said big end of the connecting rod so as to allow for splitting of said connecting rod into said rod part and said cap part by expanding said expandable element; and an electro press comprising an electric motor for actuating the expandable element by means of displacing an actuator to expand the expandable element, the method comprising the steps of:

operating the electric motor to first accelerate said actuator until it reaches a predetermined velocity, before expansion of said expandable element, and thereafter maintaining said actuator moving substantially at said predetermined velocity (for example, within a range of velocities deviating less than 10%, preferably less than 5%, more preferably less than 2% or 1% from the predetermined velocity) during expansion of said expanding element until the connecting rod has been cracked into said rod part and said cap part. As explained above, by performing the cracking phase with the actuator moving at a fixed and predetermined speed, consistent quality can be achieved over a large number of subsequently cracked connecting rods. Whereas in some embodiment the actuator comprises two parts moveable with regard to each other, it is also possible to use other kinds of actuators, for example, a one piece actuator. As suggested above, it is considered practical for most sizes and kinds of connecting rods for internal combustion vehicles, such as cars and trucks, that this predetermined velocity is substantially maintained for a couple of cm of movement of the actuator, for example, for more than 1, 2 or 3 cm, but for less than 15, 10, 8, 6, 5 or 4 cm, such as for more than 2 but less than 10 cm. The substantially constant velocity should preferably be maintained for a sufficient distance to make sure that the relevant part of the cracking process, including the first and second fracture and expansion of the expanding element, will take place while the actuator is displaced at substantially the predetermined velocity.

BRIEF DESCRIPTION OF THE DRAWINGS

Many of the attendant advantages of this invention will be readily appreciated as the same becomes better understood by reference to the following detailed description considered in conjunction with the accompanying drawings in which like reference numeral designate like parts throughout the figures thereof and wherein.

DETAILED DESCRIPTION OF THE PREFERRED EMBODIMENTS

Figure 1:
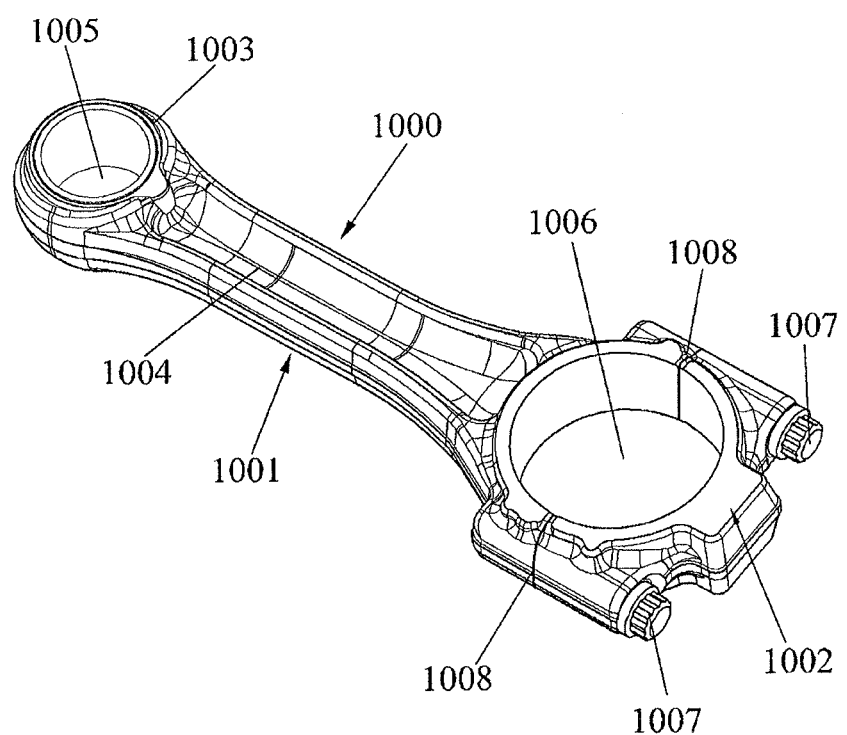
FIG. 1 illustrates an example of a connecting rod.
Figure 2A:
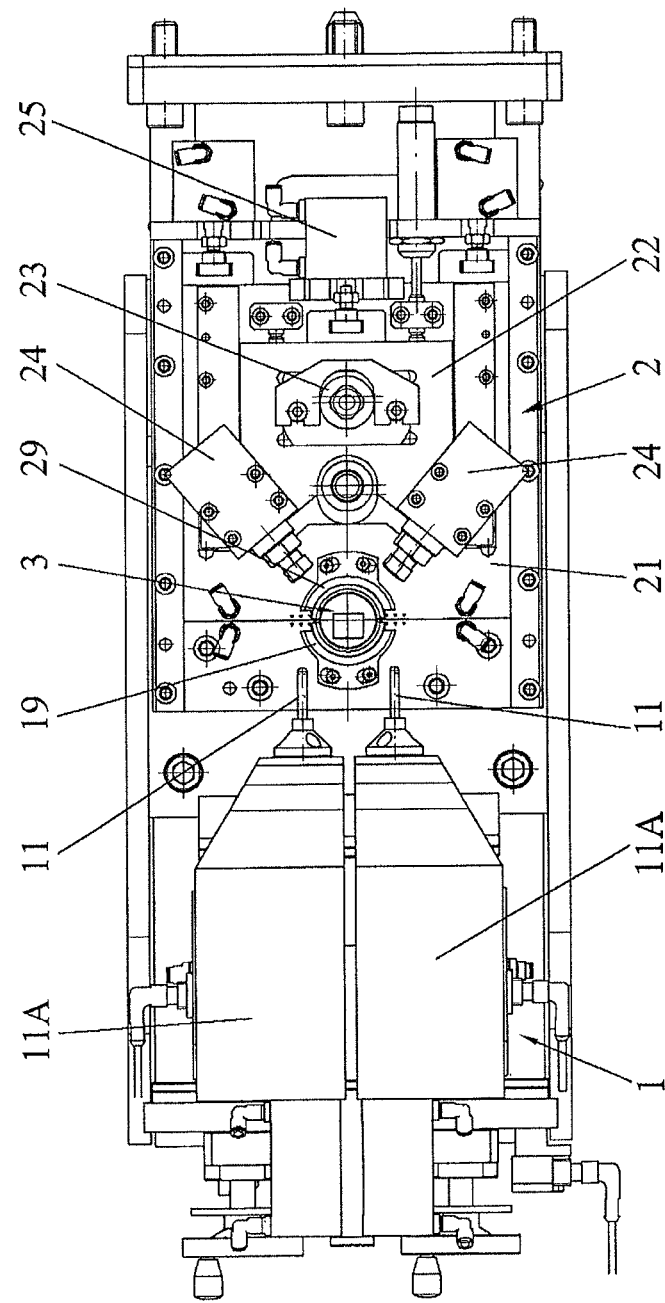
FIGS. 2A and 2B are two top views of a machine according to an embodiment of the invention, without and with a connecting rod to be cracked, respectively.
Figure 2B:
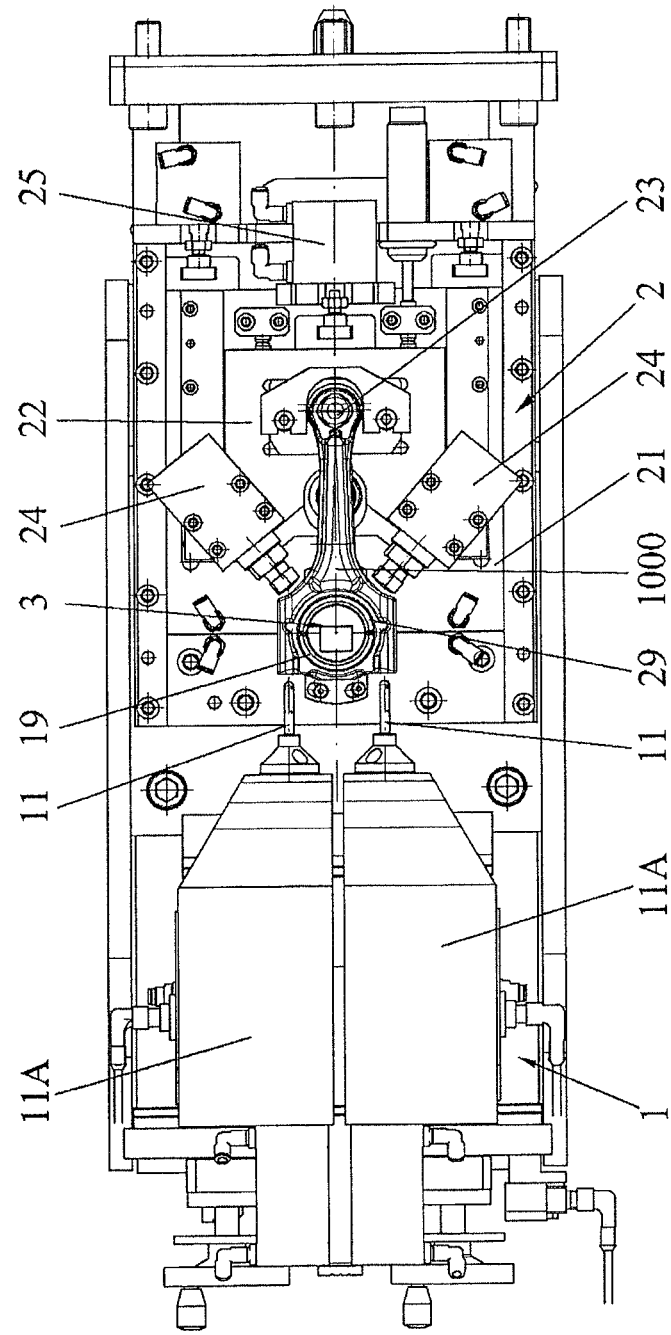

The present invention can be implemented on the basis of a machine as described in WO-2013/034782-A1, which will be described below with reference to FIGS. 2A-10, which are identical to those of WO-2013/034782-A1. FIGS. 2A and 2B schematically illustrate this machine, including a basic machine frame including a first, fixed, part 1, in relation to which a second part 2, comprising a first (main) carriage 21, is slidably mounted, between a proximal position and a distal position. The second part 2 further comprises a second carriage 22, which is slidably mounted within the first carriage, so that it can move forwards and backwards within said first carriage 21. An actuator or drive device 25 is provided on the first carriage 21, to controllably displace the second carriage 22 within the first carriage, for example, so as to bias the second carriage against stops 26 in a loading phase of the operation of the machine.

Figure 3:
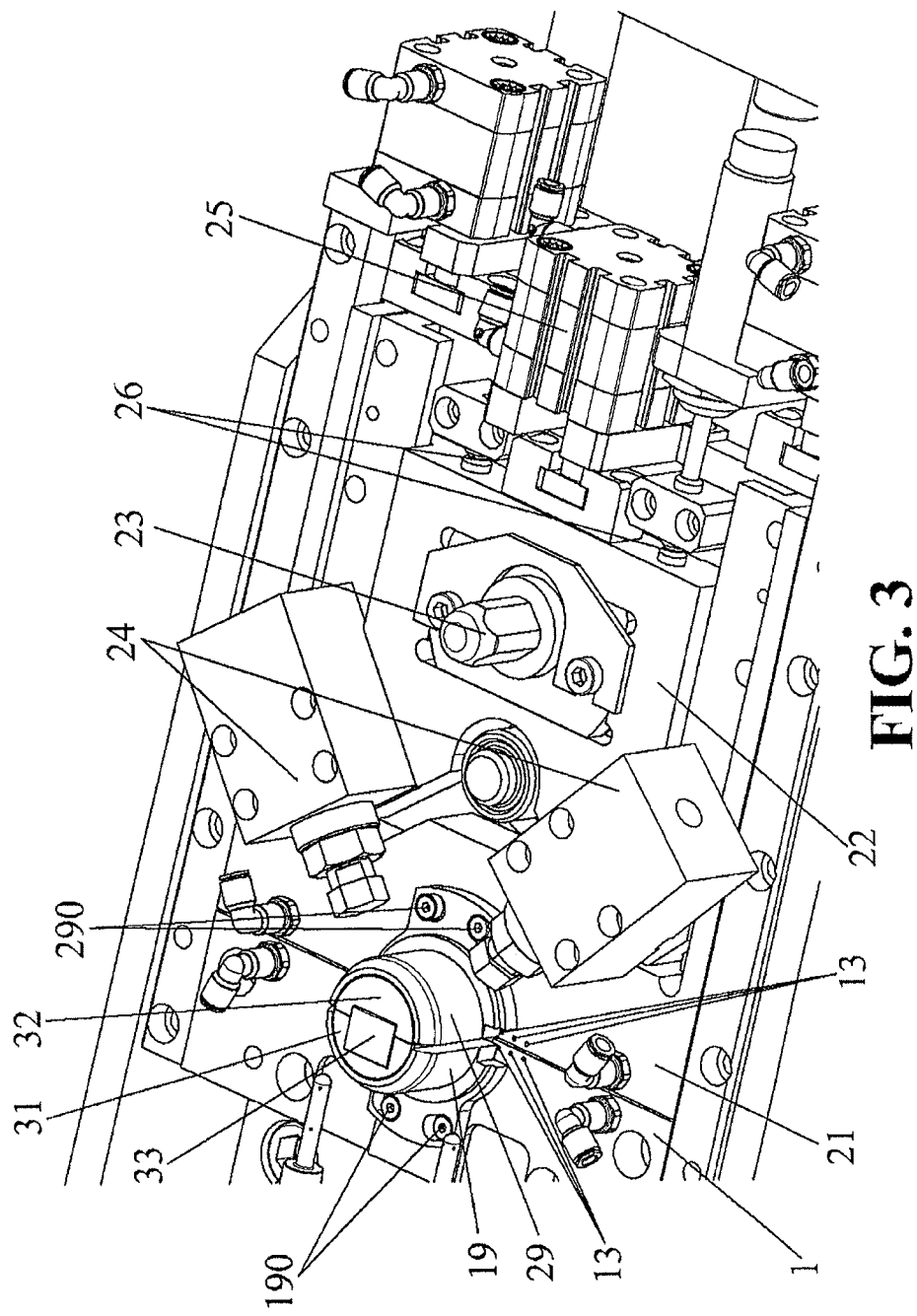
FIG. 3 is a perspective partial view of the machine of FIGS. 2A and 2B.
Figure 5:
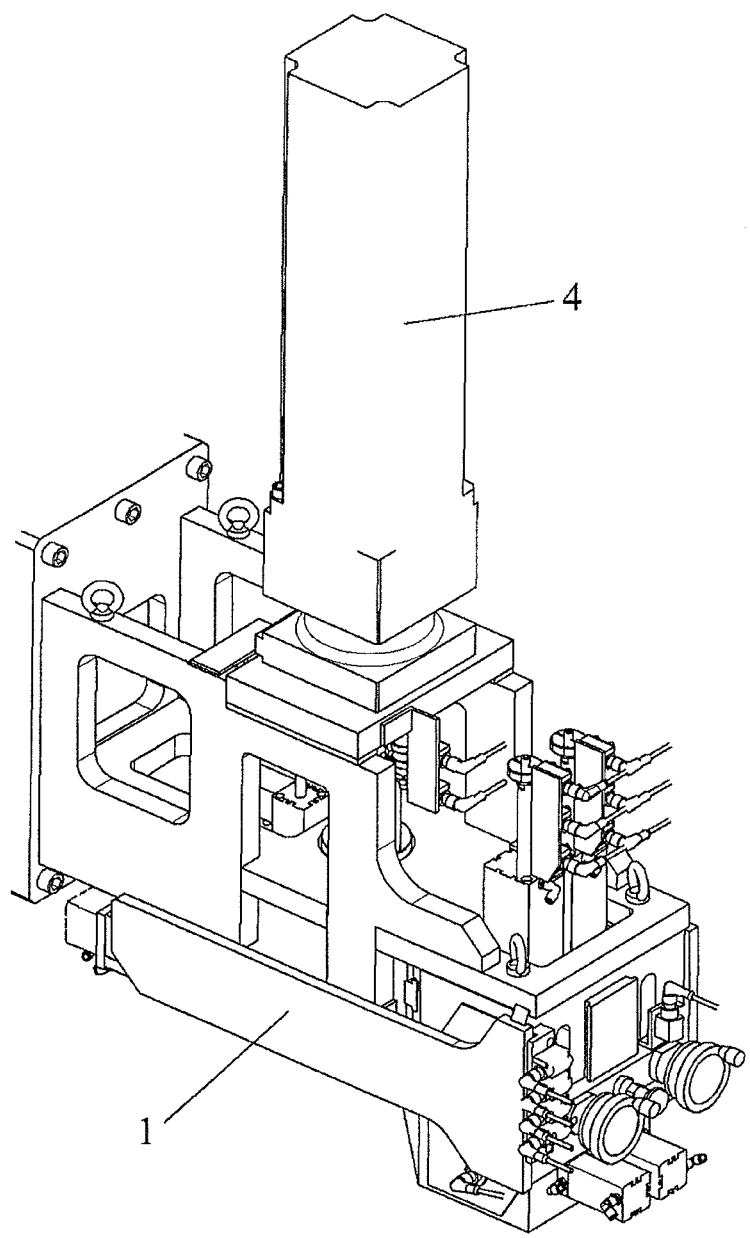
FIG. 5 is a perspective view of the machine, including the actuator of the expandable element.

As can be best seen in FIG. 3, a first half-shell or sleeve portion 19 is attached to the first part 1 by screws 190, and a second half-shell or sleeve portion 29 is attached to the first carriage 21 by screws 290. These two sleeve portions 19 and 29 form, when together (that is, when the first carriage is in the proximal position, as illustrated in FIG. 3), a protrusion, which will enter the big bore of the connecting rod 1000 when the rod is mounted in the machine for cracking (as shown in FIG. 2B). These sleeve portions form part of an expanding element 3, which further comprises two expander mandrel halves 31 and 32, positioned within the sleeve or cylinder formed by the first 19 and second 29 sleeve portions. One of these expander mandrel parts 31 is attached to the first part 1 of the machine, and the other expander mandrel part is attached to the first carriage 21. The expander mandrel halves are arranged to be separated by an advancing movement of a cleaving wedge 33. The cleaving wedge can be actuated by any suitable actuation means, such as a conventional hydraulic actuator often used in this kind of machines, although it can sometimes be preferable to use an electro press 4, as schematically illustrated in FIG. 5.

Figure 4:
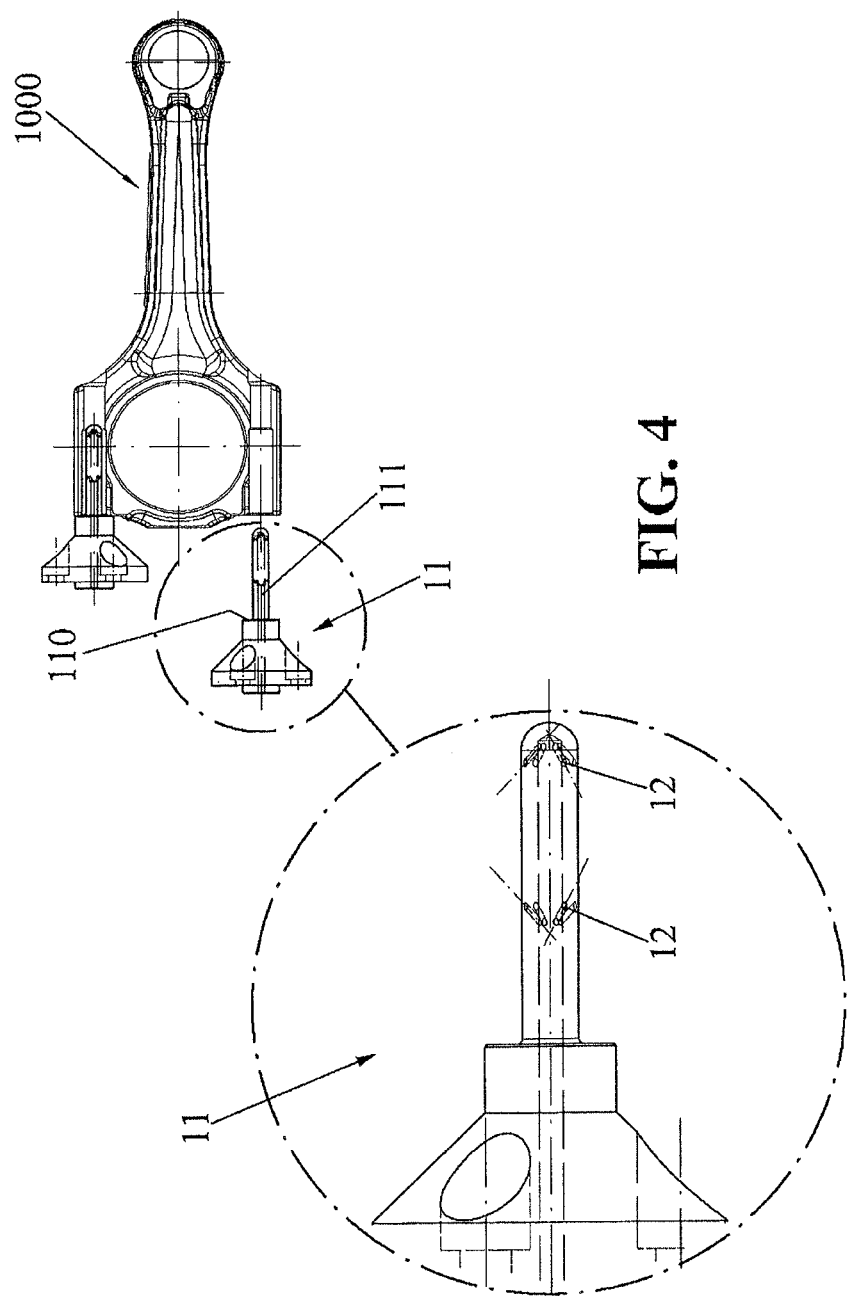
FIG. 4 schematically illustrates the first positioning elements.

In addition to the sleeve made up by the first 19 and second 29 sleeve portions, there are several further positioning means for positioning the connecting rod in the machine. First positioning means are arranged on the first part 1 and include first positioning elements 11, which are arranged to be displaced forwards and backwards by corresponding actuators housed in the carriages 11A (referred to herein as first positioning carriages), mounted on the first part 1 of the machine. These first positioning elements 11 are arranged to be at least partially inserted into the screw bores of the connecting rod that are used to house the screws that attach the cap part to the rod part after cracking, as schematically illustrated in FIG. 4. These first positioning elements include a spindle part or portion 111 which is inserted into said screw bores from the cap part end of the connecting rod, and a contact surface 110 or abutment portion which, when the positioning elements are brought towards the connecting rod during operation of the machine, abuts against the cap portion of the connecting rod and thus biases it towards the first sleeve portion 19, establishing contact with said first sleeve portion 19. The spindle parts thus become fully inserted into the screw bores. As illustrated in FIG. 4, the spindle parts 111 include fluid outlets 12 and, during operation of the machine, a cleansing fluid can be provided to constantly or intermittently flow out of these outlets 12. These outlets are positioned so that when cracking takes place, fluid from these fluid outlets 12 will impinge on the crack surfaces of the cap part and/or the rod part, so as to help to remove loose particles.

On the other hand, as best shown in FIG. 3, further fluid outlets 13 are provided in the first part 1 and in the first carriage 21, adjacent to the area where the two sleeve parts 19 and 29 meet, so as to provide further fluid to the crack surfaces when cracking take place, so as to help to remove loose particles.

The fluid can be, for example, compressed air.

Further positioning means for positioning the connecting rod for cracking comprise a centering pin 23, arranged to fit into the small bore 1005 of the connecting rod, and two additional positioners 24 arranged to bias the large end of the connecting rod away from the centering pin 23. The centering pin 23 and the additional positioners 24 are arranged on the second carriage 22 which, as explained above, is moveable within the first carriage 21. The purpose of this floating arrangement of the positioning means is to reduce the risk for excessive stresses or forces that may damage or deteriorate the connecting rod during an initial phase of the cracking operation.

In accordance with the present embodiment, when the connecting rod is to be placed in the machine, the second carriage 21 is biased against the stops 26 by the actuator 25, and the connecting rod is inserted into the machine, so that the centering pin 23 enters the small bore of the connecting rod. The centering pin 23 can be displaced towards the first part 1 by external forces, so as to facilitate a correct positioning of the connecting rod, which is placed so that the sleeve 19+29 enters the large bore 1006 of the connecting rod.

Once the connecting rod has been positioned, the first positioning elements 11 are brought forwards (that is, towards the connecting rod), the spindles 111 enter the screw bores, and the contact surfaces 110 abut against the cap portion of the connecting rod, so that the connecting rod is firmly biased against, and in contact with, the first sleeve portion 19; both the actuators of the first positioning elements (housed in the first positioning carriages 11A) and the actuator 25 thus tend to bias the connecting rod towards the first sleeve portion 19. This gives rise to a small separation between the inner surface of the large bore of the connecting rod, and the second sleeve portion 29.

When the cleaving wedge 33 starts to advance, the second sleeve portion 29 is forced to move away from the first sleeve portion 19, towards the small end of the connecting rod; the first carriage 21 on which the second sleeve portion 29 is mounted will likewise move. If the small end of the connecting rod had been fixed to the first carriage 21, tensions would have occurred in the connecting rod, as its large end is prevented from moving by the first sleeve portion 19. However, as the connecting pin 23 is mounted on the second carriage 22, which is floating with regard to the first carriage 21, the connecting rod can maintain its original position without substantial stresses, in spite of this initial movement of the first carriage 21. Thereby, these tensions and stresses do not occur or are, at least, substantially reduced.

Once the second sleeve portion 29 abuts the inner surface of the large bore of the connecting rod, cracking takes place in the normal way, in accordance with notches or similar, previously made by, for example, laser, in a conventional way. After cracking, the rod part and the cap part are separated, and the rod part is carried away from the cap part due to the movement of the first carriage 21.

FIG. 5 schematically illustrates the use of an electro press instead of the conventionally used hydraulic press. The advantages involved have been described above.

Figure 6:
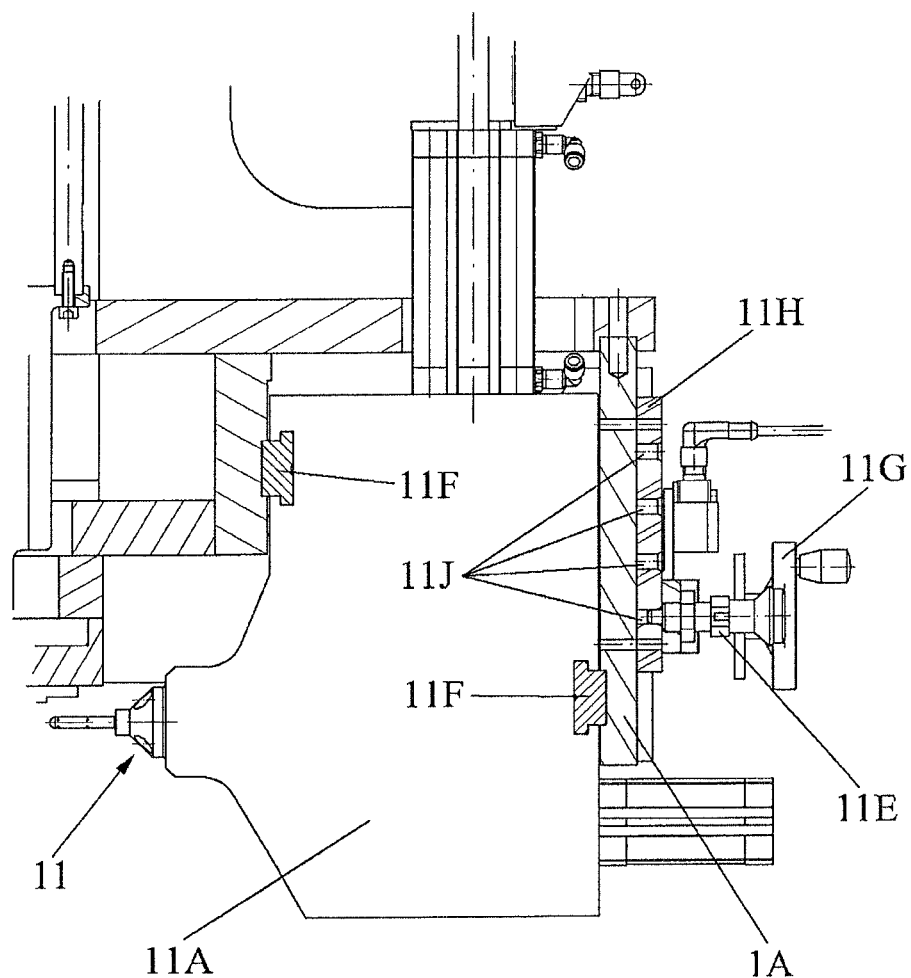
FIG. 6 is a lateral view in cross section of a first positioning carriage and associated equipment.

In order to adapt the machine to different kinds of connecting rods to be produced, it can be necessary to change the distance between the first positioning elements 11, so as to adapt this distance to the distance between the screw bores at the cap end of the connecting rod to be produced, so that the spindle portions 111 can be inserted into said screw bores or, if the first positioning elements do not include this kind of spindle portions, the contact surface 110 will abut against the big end of the connecting rod at a desired point or area of said big end. In order to facilitate this, the first positioning elements 11 can be placed in first positioning carriages 11A that are arranged laterally displaceable along horizontal guides 11F, as shown in FIG. 6. These guides 11 Fare associated to a fixed part 1A of the machine, which can be fixed with regard to, for example, the first part 1 of the machine. Hand-wheels 11G are mounted to said fixed part 1A for displacing blocking elements 11C used to block the first positioning carriages in selected positions, each of said selected positions corresponding to a predetermined position of the corresponding first positioning element 11. Thus, by placing the first positioning carriages at a selected specific position, the machine can be adapted to manufacture a specific kind of connecting rod, having a specific distance between the screw bores.

Figure 7:
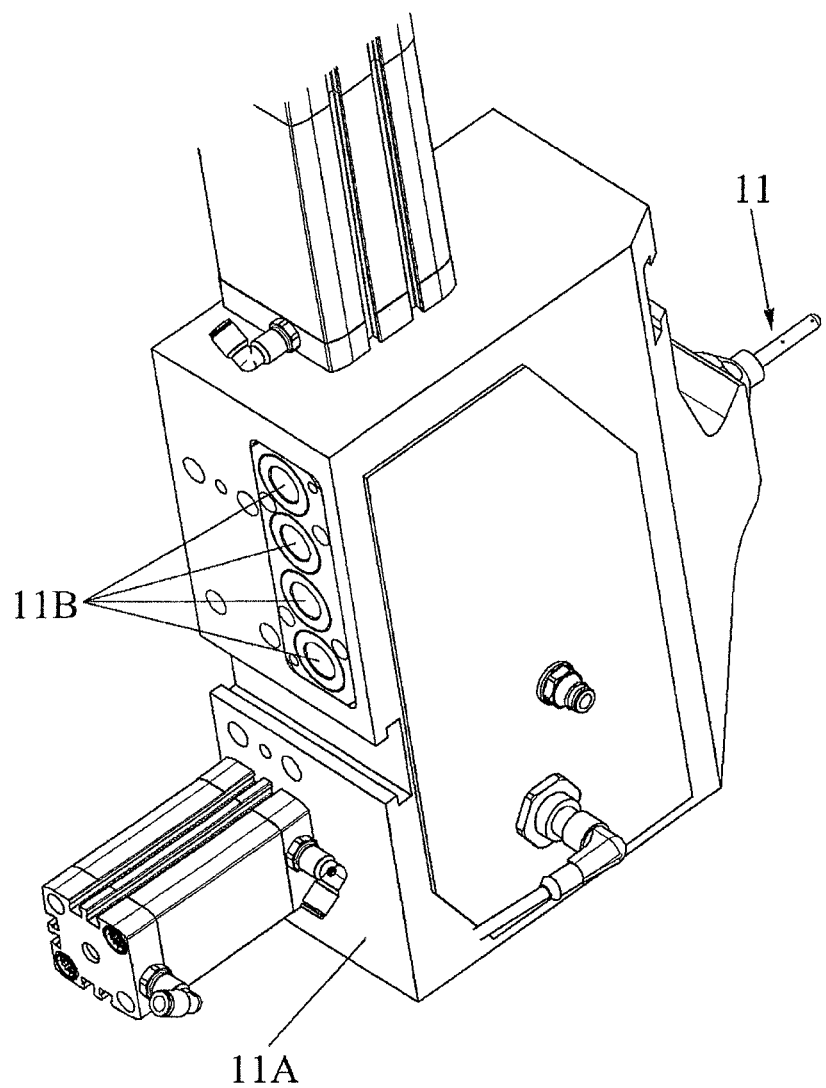
FIG. 7 is a perspective view of a first positioning carriage.
Figure 8:
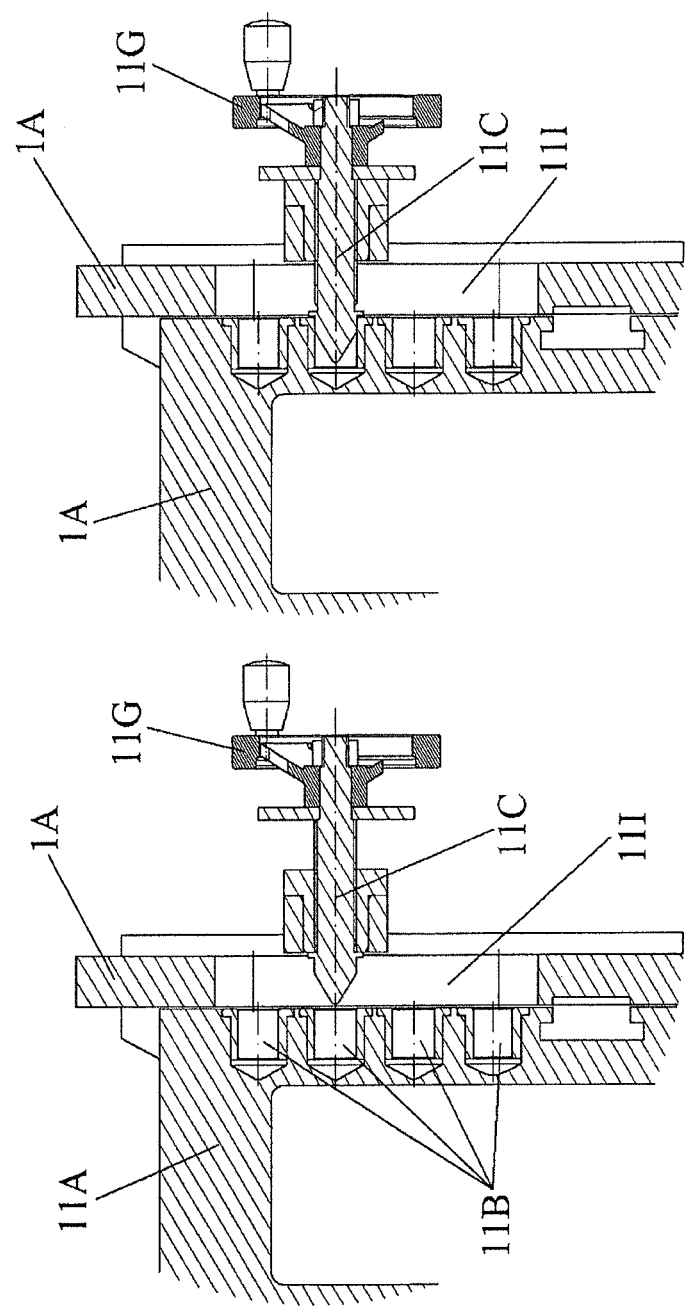
FIGS. 8A and 8B are schematic lateral views in cross section of a first positioning carriage and associated equipment, illustrating how a carriage is blocked into position.

FIG. 7 illustrates how a first positioning carriage is provided with a plurality of openings 11B, distributed in the vertical direction. Each of said openings has a specific position also in the lateral or horizontal direction (at a first look, it may seem that the openings 11B are all in the same position along the horizontal axis, but this is only due to the fact that the openings are substantially larger than the difference in their position in the horizontal direction; the difference between the distances of the screw bores of different connecting rods can be rather small, so that the lateral displacement of the first positioning carriages needed for adapting the machine to different kinds of connecting rods is often not very big; however, using fairly large openings 11B can be preferred; for example, it can be preferred that all of the openings overlap with each other by more than 50% when projected—orthogonally—onto the horizontal axis, as this can facilitate insertion of the blocking element when switching from one opening to another, as will be clear from our discussion below).

Thus, by inserting the blocking element 11C into a selected one of said openings 11B, the carriage 11A can be placed in a specific lateral/horizontal position, corresponding to a specific position of the first positioning element. Figure BA shows how the blocking element 11C has been placed at the level of the second opening 11B from above, and by rotating the hand-wheel 11G the blocking element is introduced into this opening, to the position shown in Figure BB, where it fits snugly into said opening 11B, thus blocking the carriage 11A in a certain selected lateral position.

As can be seen in FIGS. 8A and 8B, the blocking element 11C has a conical end. FIG. 7 illustrates how the openings 11B all have a size such that they overlap substantially when projected onto the horizontal axis. That is, when displacing the blocking element 11C in the vertical direction so as to change it from having been inserted into one of these openings to be inserted into another one of these openings, the tip of the blocking element will be in correspondence with the new opening, thereby avoiding the need to "manually" displace the carriage laterally to be able to insert the tip into the corresponding opening. Now, when rotating the handwheel so as to introduce the blocking element into the new opening, due the beveled character of the end and the snug fit between the blocking element 11C and the opening 11B when the blocking element is fully inserted, the advancing movement of the blocking element 11C will displace the carriage 11A laterally to its desired position.

Figure 9:
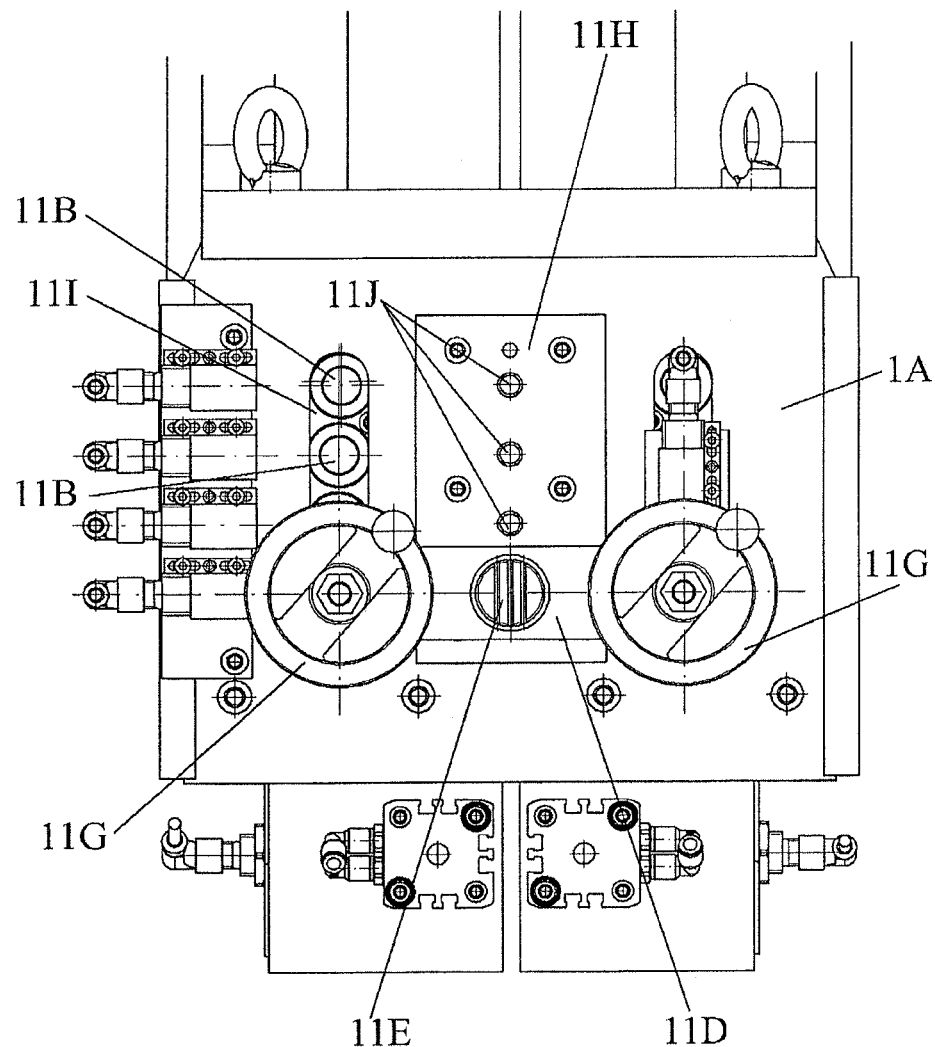
FIG. 9 is a schematic rear view of the part of the machine associated to the first positioning carriages.
Figure 10:
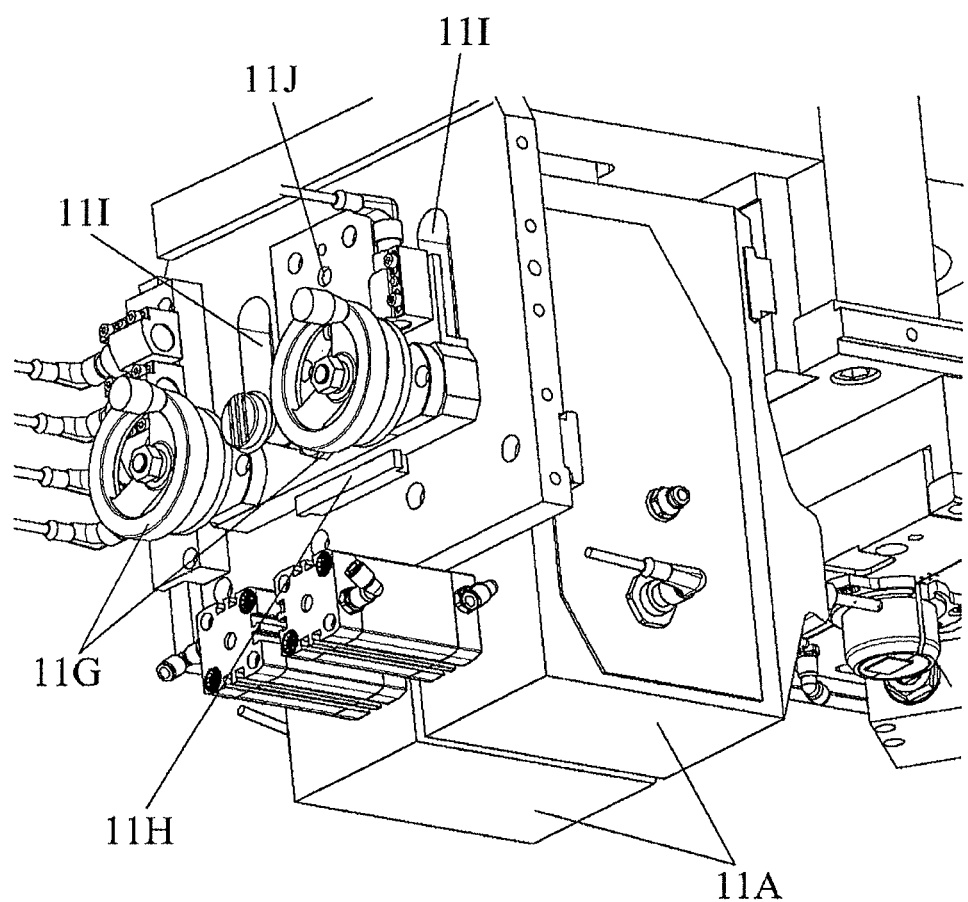
FIG. 10 Is a perspective rear view of said part of the machine.

FIGS. 9 and 10 illustrate a vertical guide 11H for the joining structure 11D by which the blocking elements 11C corresponding to the two carriages 11A are joined to each other, together with their associated hand-wheels 11G. This guide is mounted at the rear part of the fixed part 1A of the machine, and includes a plurality of openings 11J, each of said openings corresponding to one of the openings 11B in the carriages 11A. It can be seen how the openings 11B in the carriages 11A are visible from the rear part through the slots 11I through which the blocking elements 11C penetrate (cf. also FIGS. 8A and 8B).

In the position shown in FIG. 9, the blocking elements 11C are associated to the lowermost openings 11B of the two carriages 11A. To change the machine for the manufacture of a connecting rod having a different distance between the screw bores at the cap end, for example, the distance corresponding to the second opening 11G from above, the operator of the machine will first move the hand-wheels 11G so as to withdraw the blocking elements 11C out of the openings 11B. Next, the operator will pull the blocking means 11E backwards, so that a corresponding pin is drawn out of the lowest ones of the openings 11J. Next, the operator will, for example, manually, lift the whole blocking arrangement, including the joining structure 11D, the hand-wheels 11G, and the associated blocking elements 11C, until the pin (not shown) of the blocking means 11E reaches the level of the second opening 11J from above, where the operator will let the pin (such as a spring-loaded pin) snap into this opening. This corresponds to the position of Figure BA. The operator can now simply turn the hand-wheels to introduce the blocking elements 11C into the second openings 11B from above, and during this insertion of the blocking elements into the respective openings 11B, the two carriages 11A are displaced to their new positions, thus positioning the first positioning elements in the correct position for manufacture of the new kind of connecting rod.

Of course, the invention can also be implemented in different kinds of machines, and in variants of the machine discussed with reference to FIGS. 2A-10.

For example, in some variants, the additional positioners 24 are omitted.

Figure 11:
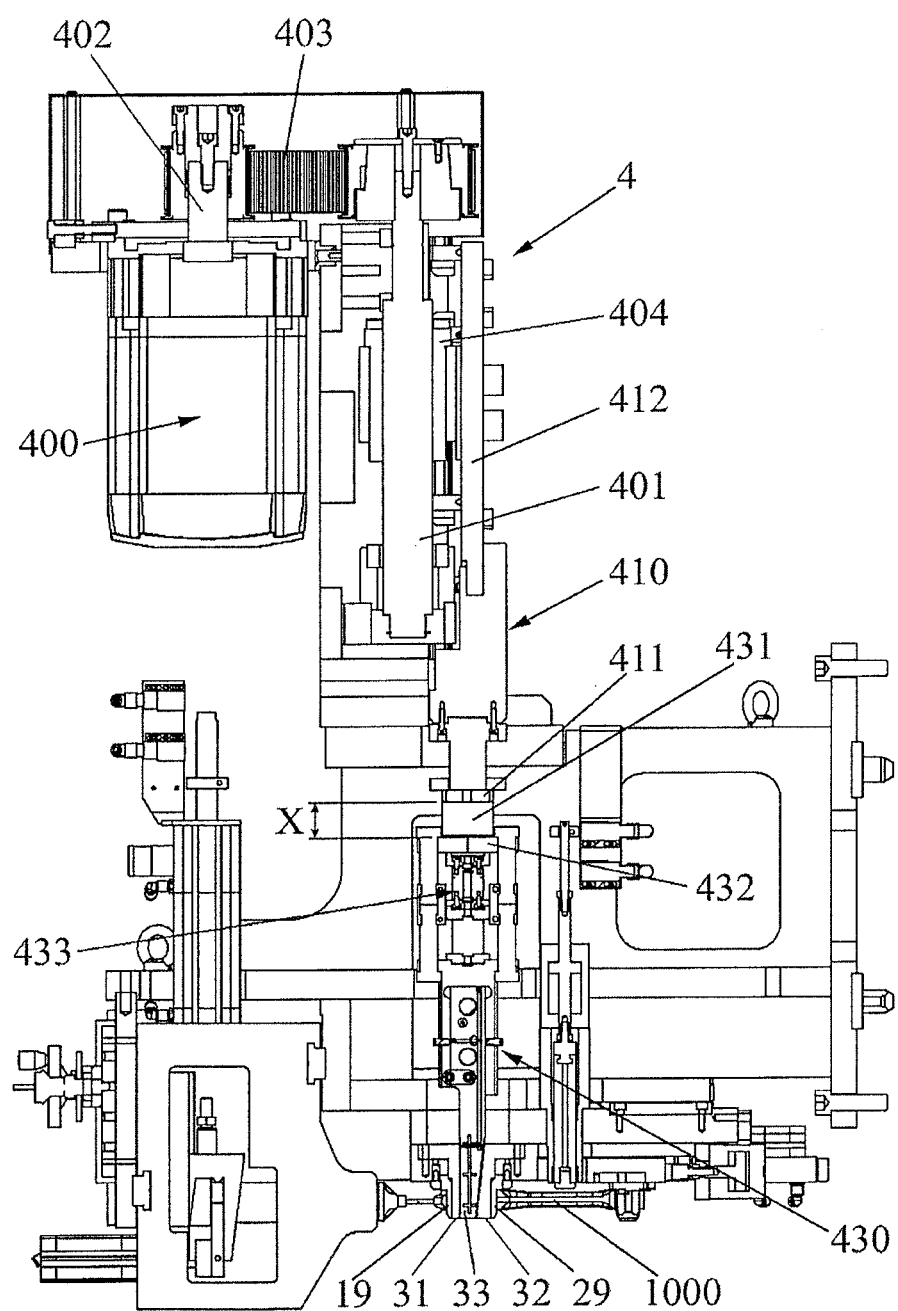
FIG. 11 is a schematic cross sectional view of the machine in accordance with a preferred embodiment of the invention.
Figure 12A:
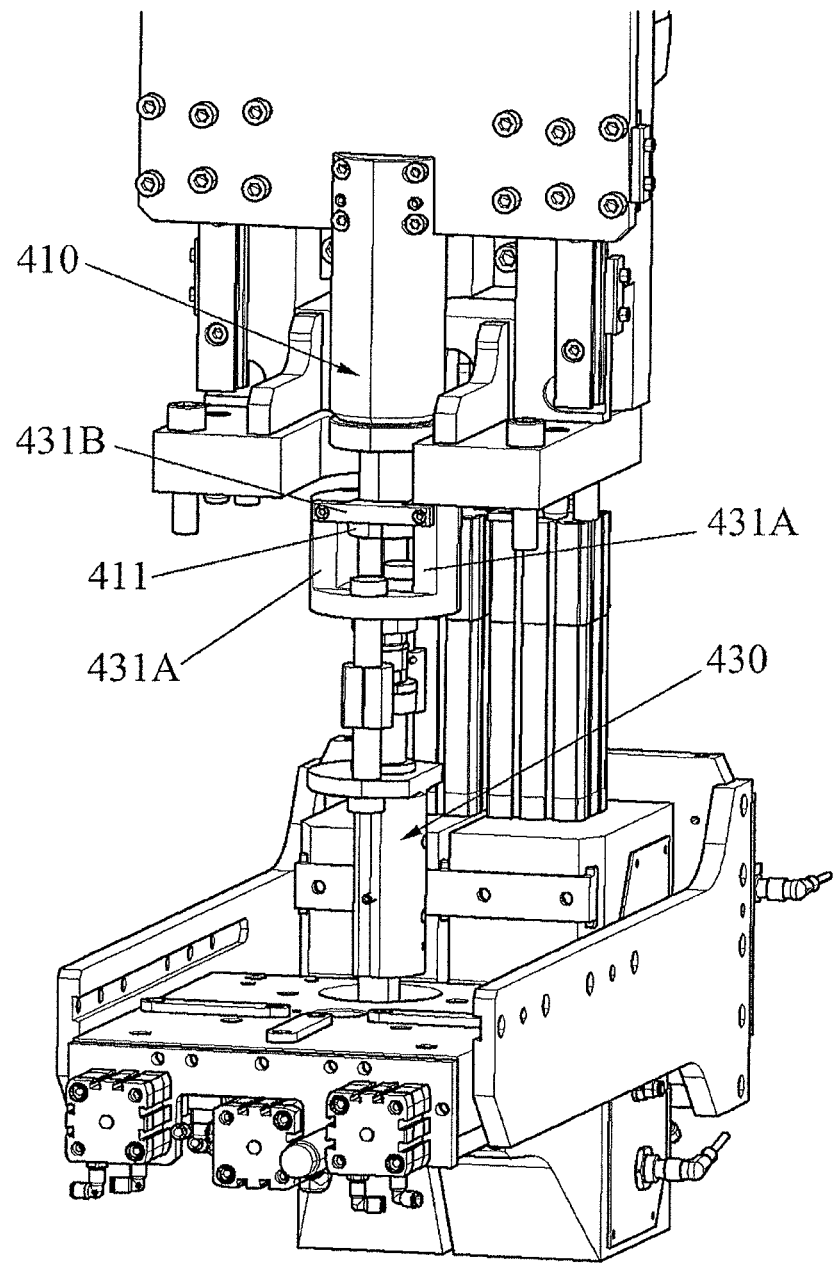
FIGS. 12A, 12B, 12C and 12D are schematic perspective views of part of the mechanism for driving the cleaving wedge, at four different stages of the cracking process.

FIG. 11 schematically illustrates a cross section of the machine in accordance with an embodiment of the invention, with a connecting rod 1000 being arranged in a position for cracking, and wherein said cracking is produced by displacing the cleaving wedge 33 so as to separate the two expanding mandrel halves 31 and 32, and thus the optional sleeve portions 19 and 29, as explained above. The cleaving wedge 33 is driven by an electric press 4 comprising an electric motor 400, having a vertically oriented output shaft 402 which, through a belt, chain or other suitable transmission means 403, drives a vertically oriented threaded shaft or spindle 401 so that this spindle rotates around its vertical axis. A carriage 412 is connected to a threaded nut 404 or similar so that when the spindle 401 rotates, the carriage 412 is driven upwards or downwards, depending on the direction of the rotation of the spindle 401. A first actuator element 410 is connected to the carriage so that it can be driven between a first position, shown in FIG. 12A, and a second position, shown in FIG. 12C.

Figure 12B:
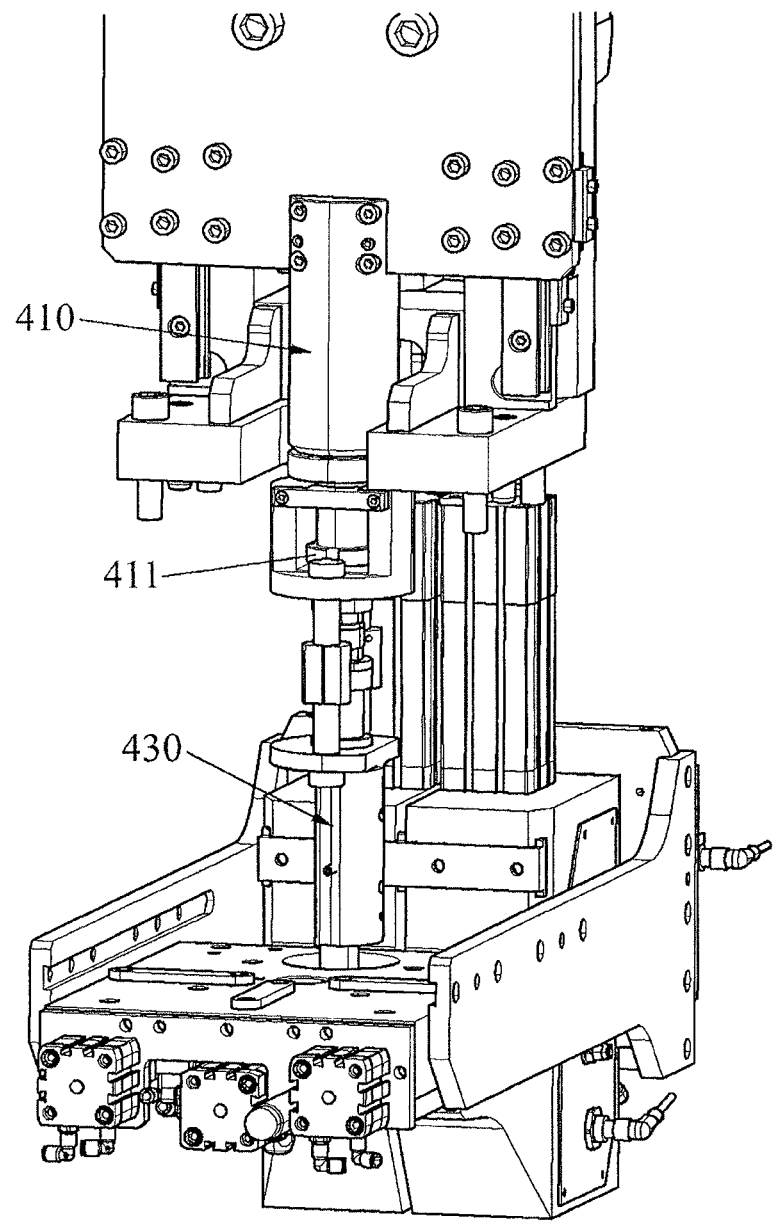
Figure 12C:
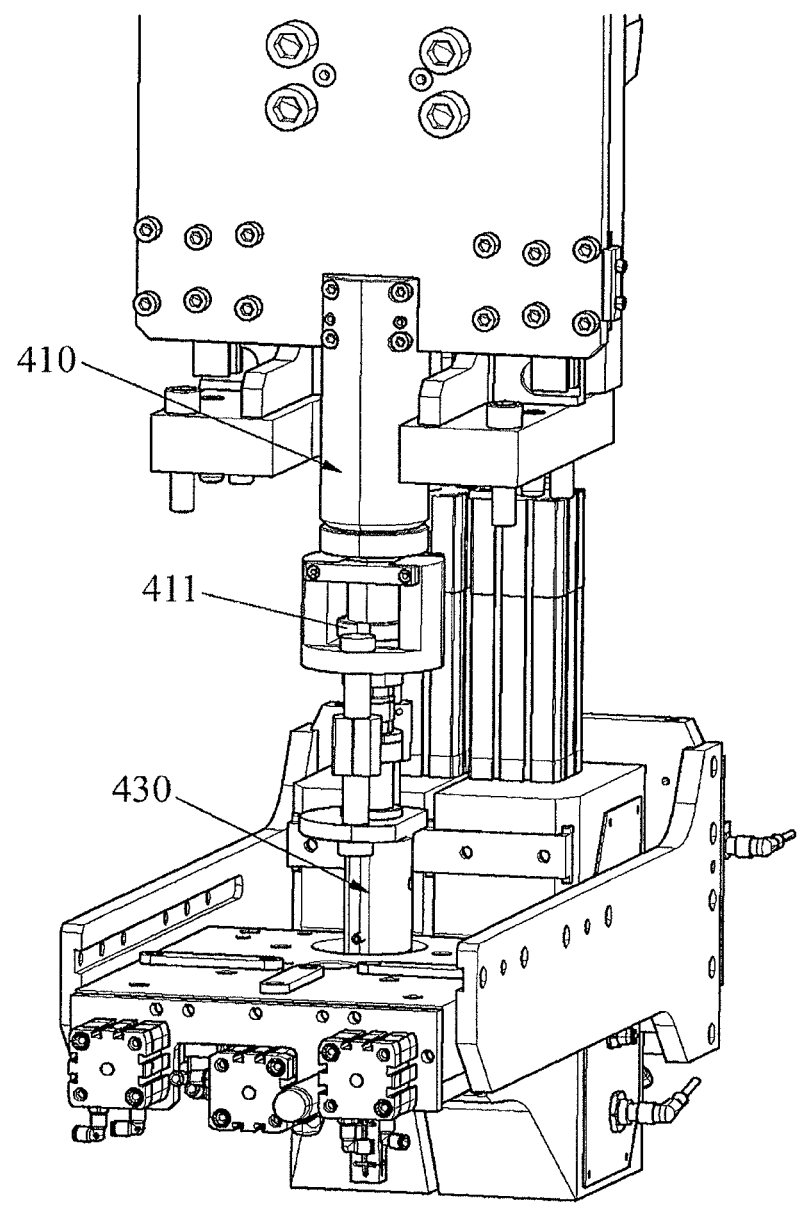

On the other hand, the cleaving wedge 33 is a lower end part of a second actuator part 430, said second actuator part having an upper end portion 432 against which the first actuator part collides when it moves down from said first position to said second position, more specifically, when reaching an intermediate position as shown in FIG. 12B.

The first actuator part 410 has an end portion 411 which is arranged to contact said second actuator part when the first actuator part 410 reaches said intermediate position when coming from said first position. Said end portion 411 of said first actuator part 410 is retained within a retaining portion 431 of said second actuator part, basically, within a kind of cage structure comprising vertical members 431A or walls and horizontal retaining members 431B, arranged to prevent the end portion 411 of said first actuator part 410 from being withdrawn from said retaining portion 431. The retaining portion is designed so as to allow a relative movement between said first actuator part 410 and said second actuator part, in the vertical or axial direction, to an extent that corresponds to the distance between said first position and said intermediate position.

A pressure sensor 433 can be included, for example, as part of the second actuator part 430. This pressure sensor can be used to detect variations in the pressure exerted by the second actuator part, and this information can be transmitted to a control unit (not shown in FIG. 11) and used to determine, for example, when the first and second fractures take place and, thus, to verify that the cracking process is performed in the desired manner, for example, with the time between the two fractures being within a desired time interval.

Thus, as shown in FIGS. 12A-12D, the process of cracking a connecting rod can comprise the following steps:

In FIG. 11, the first actuator part 410 is in its first or uppermost position, also shown in FIG. 12A. From here, the electric motor 400 is actuated to rotate the spindle 401 so as to drive the carriage 412 with the first actuator part 410 downwards, accelerating it until reaching a desired speed. Due to the distance X between the opposing ends 411 and 432 of the first and second actuator parts (see FIG. 11), during this step, the second actuator part is not displaced; the first end 411 of the first actuator part merely moves downwards within the retaining structure 431. Thus, the motor can accelerate the first actuator part without having to overcome any force due to displacement of the cleaving wedge 33 which forms part of the second actuator part 430.

In FIG. 12B, the first actuator part 410 has been driven down and accelerated until it reaches the intermediate position, when its end 411 impacts on the upper end 432 of the second actuator part 430. From now on, the electric motor 400 continues to drive the first actuator part 410 downwards and, with it, the second actuator part 430, whereby the cleaving wedge 33 is displaced downwards and separates the mandrel halves 31 and 32, to produce the cracking of the connecting rod. The first actuator part is driven downwards until reaching the second position, schematically illustrated in FIG. 12C.

Figure 12D:
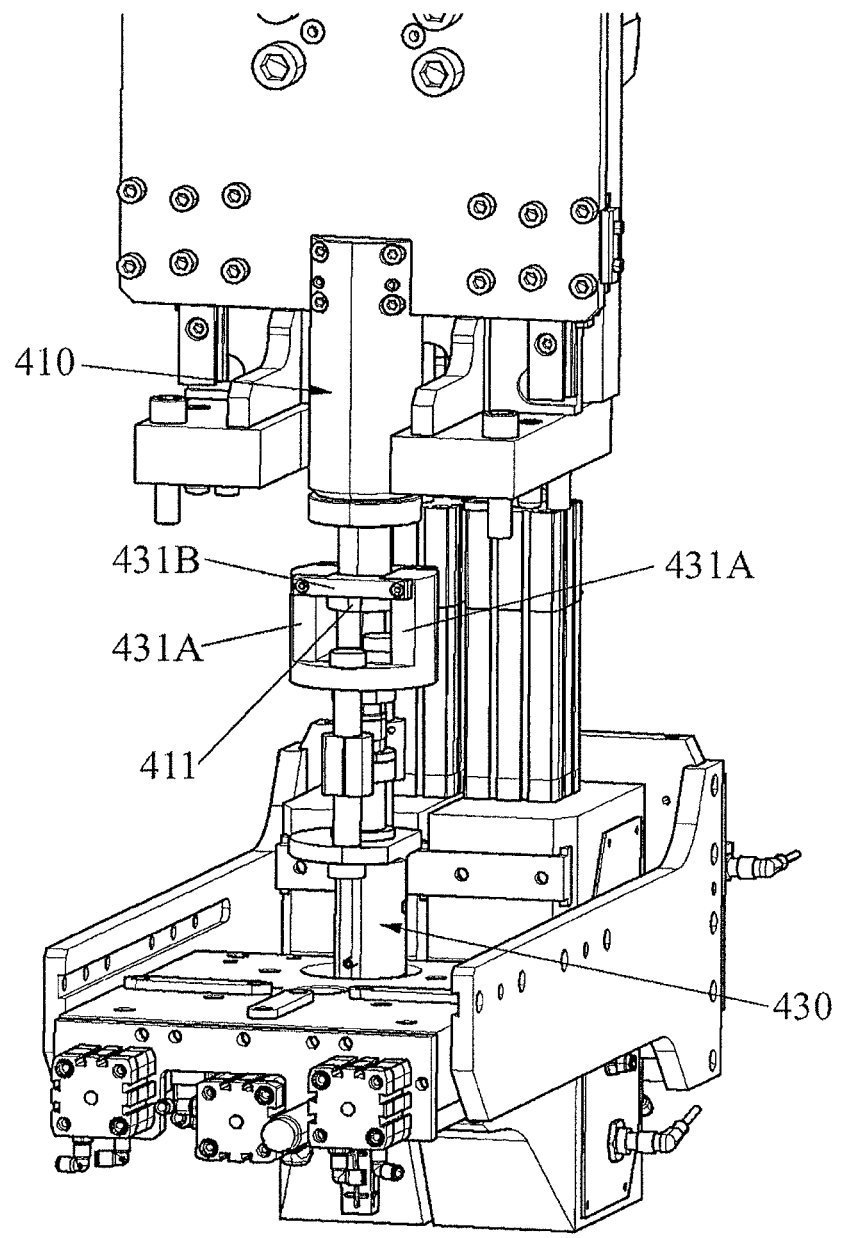

After cracking, the electric motor is reversed to drive the first actuator part 410 upwards. After moving upward a distance X corresponding to the freedom of movement allowed by the retaining portion 431, the end portion 411 of the first actuator part, which has a larger diameter than the adjacent portion of the first actuator part 410, abuts from below against the horizontal retaining members 431B (as shown in FIG. 12D), thereby pulling the second actuator part 430 upwards, until it reaches its initial position, shown in FIG. 12A. At this state, the cleaving wedge has been withdrawn and returned to the position shown in FIG. 12A, and a new connecting rod can be loaded into them machine, where after the process can be repeated.

Figure 13:
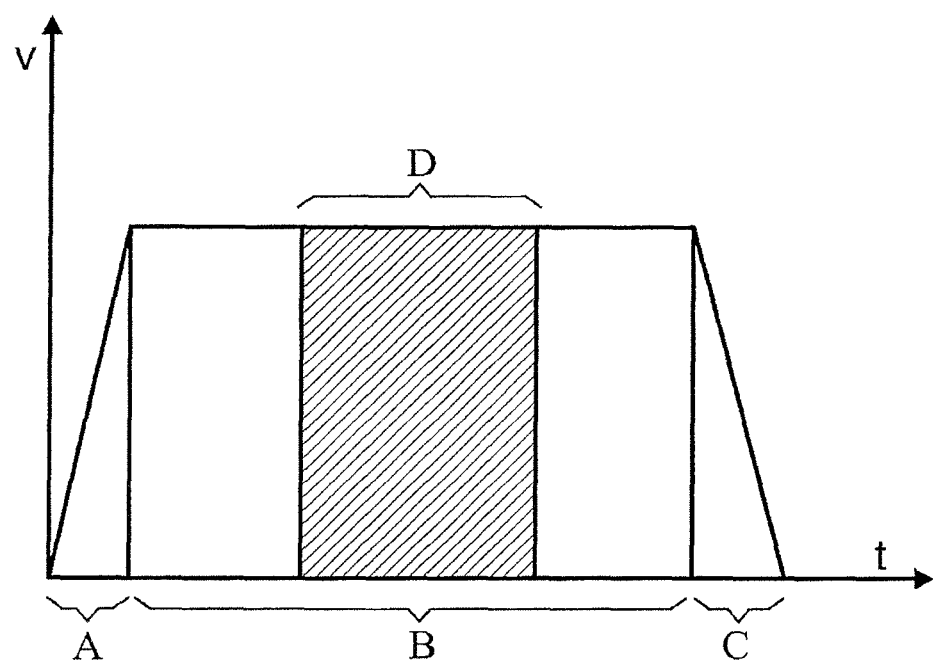
FIG. 13 schematically illustrates the velocity of the first actuator part as a function of time, in accordance with an embodiment of the invention.

FIG. 13 schematically illustrates how the electric motor can be operated to first accelerate the first actuator part, during interval A, until it reaches a predetermined velocity. The electric motor is operated to maintain the first actuator part moving at said predetermined velocity during interval B, and to thereafter decelerate the movement during a further interval C. In a preferred embodiment of the invention, the first actuator part starts to displace the second actuator part after the predetermined velocity has been reached, and thereafter continues to move substantially at the predetermined velocity during interval D, during which expansion of the expanding element and cracking of the connecting rod takes place, with the two fractures. It has been found that carrying out the entire cracking in an interval in which the first and second actuator parts are moving at a substantially constant velocity helps make sure that subsequent crankshafts are cracked in a very similar manner, thereby ensuring repeatability of the process.

Figure 14:
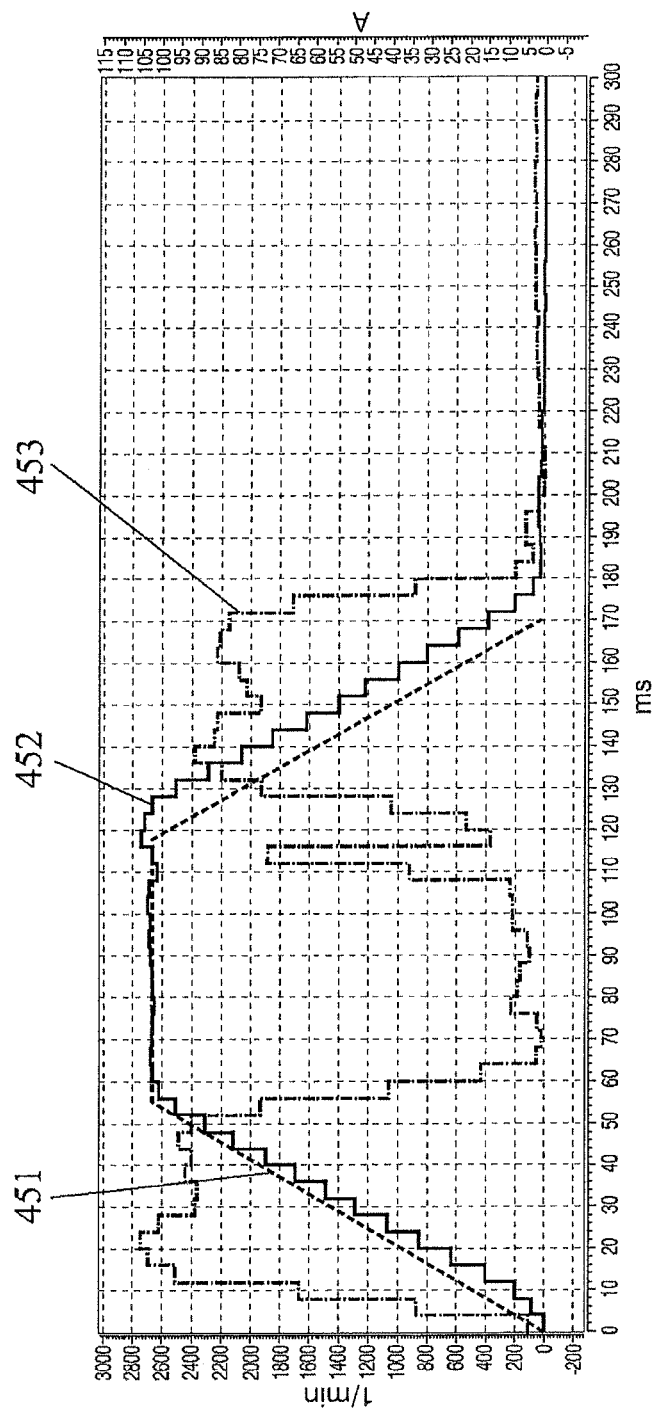
FIG. 14 illustrates the results of a test of a machine in accordance with an embodiment of the invention.

FIG. 14 schematically illustrates the results of a test of a machine as described above, using a servomotor as the electric motor 400. A first graph 451 illustrates the theoretical velocity of the first actuator part (the left vertical axis indicates the speed of the motor, in rounds per minute; this velocity is proportional to the speed with which the first actuator part is displaced in the vertical direction); as shown by said graph, it was desired that the first actuator part should first accelerate until reaching a predetermined velocity (of about 600 mm/s, which in the embodiment of the invention that was tested corresponded to a motor speed of about 2700 rpm), at which it should be kept during the cracking process, and thereafter deceleration should take place. A second graph 452 illustrates the velocity of the motor as measured during the test, and a third graph 453 illustrates the motor current (the right-hand vertical axis indicates the effective motor current in A). In FIG. 14 it can be observed how no substantial breaking of the first actuator part took place during the cracking process, that is, the momentum of the first actuator part and the drive force of the motor were enough to perform cracking at a substantially constant speed. The current graph 453 shows high motor currents during acceleration (corresponding to interval A in FIG. 13) and deceleration (corresponding to interval C in FIG. 13), and in between there is a short current peak corresponding to the point of time when cracking takes place. It is clear from this graph that it is possible, by using an adequately programmed servomotor, to keep the speed of the actuator parts substantially constant during cracking, thereby achieving adequate process control and repeatability. In this test, the total amplitude of the displacement of the first actuator part in the vertical direction was about 70 mm, and the constant predetermined velocity of about 600 mm/s was substantially maintained during approximately 38 mm, including an interval before and after the cracking that took place at approximately 110 ms, where a current peak can be observed in FIG. 14.

LIST OF REFERENCE NUMBERS 1 first part of the machine
1A fixed part of the machine, which can be fixed in relation to said first part of the machine
2 second part of the machine
3 expandable element
4 electro press
11 first positioning elements
11A first positioning carriages, housing, for example, the actuators of the first positioning elements
11B first coupling means, for fixing the lateral position of the first position carriages; these first coupling means can be openings
11C second coupling means arranged to interact with the first coupling means to fix the position of the first position carriages; these second coupling means can comprise a blocking element to be inserted into one of the openings
11D joining structure
11E blocking means of the joining structure
11F horizontal guides
11G handwheel for displacing a blocking element 11C
11H vertical guide for the joining structure 11D
11I slots
11J openings in the vertical guide 11H
12 fluid outlets in the first positioning elements
13 fluid outlets
19 first sleeve portion
21 first carriage of the second part
22 second carriage of the second part
23 second positioning element
24 additional positioning elements
25 drive device/actuator
26 stops
29 second sleeve portion
31,32 expander mandrel halves
33 cleaving wedge
110 contact surface
111 spindle portion
190,290 screws
400 electric motor
401 spindle
402 output shaft of the electric motor
403 transmission means such as belt or chain
404 nut
410 first actuator part of the electro press
411 end portion of the first actuator part
412 carriage connected to the spindle
430 second actuator part of the electro press
431 retaining portion
431A vertical members
431B horizontal retaining members
432 end portion of the second actuator part
433 pressure sensor
451 desired velocity graph
452 measured velocity graph
453 motor current graph
1000 connecting rod
1001 rod
1002 cap
1003 small end
1004 stem 1005 small bore
1006 big bore
1007 screws
1008 joint between rod and cap
A acceleration stage
B stage with substantially constant, predetermined speed
C deceleration/braking stage
D expansion and cracking stage
X distance between the first position and the intermediate position of the first actuator part In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

What is claimed is:

1. Method of cracking a connecting rod having a small end and a big end, into a rod part (1001) and a cap part (1002), using a machine comprising:
    positioning elements for positioning said connecting rod in a position for cracking;
    an expandable element (3) arranged to be inserted into a bore in said big end of the connecting rod so as to allow for splitting of said connecting rod (1000) into said rod part (1001) and said cap part (1002) by expanding said expandable element; and
    an electro press (4) comprising an electric motor (400) for actuating the expandable element by means of displacing an actuator (410, 430) to expand said expandable element;
    the method comprising the steps of:
        operating the electric motor (400) to first accelerate said actuator (410, 430) until it reaches a predetermined velocity before expansion of said expandable element (3), and
        thereafter maintaining said actuator moving substantially at said predetermined velocity during expansion of said expandable element (3) until the connecting rod has been cracked into said rod part and said cap part.

2. Method according to claim 1, wherein the step of thereafter maintaining said actuator moving substantially at said predetermined velocity is carried out so that said actuator is maintained moving within a range of velocities deviating less than 10% from said predetermined velocity.

3. Method according to claim 2, wherein the step of thereafter maintaining said actuator moving substantially at said predetermined velocity is carried out so that said actuator is maintained moving within a range of velocities deviating less than 5% from said predetermined velocity.

4. Method according to claim 3, wherein the step of thereafter maintaining said actuator moving substantially at said predetermined velocity is carried out so that said actuator is maintained moving within a range of velocities deviating less than 2% from said predetermined velocity.

5. Method according to claim 4, wherein the step of thereafter maintaining said actuator moving substantially at said predetermined velocity is carried out so that said actuator is maintained moving within a range of velocities deviating less than 1% from said predetermined velocity.

6. Method according to claim 2, wherein during the step of thereafter maintaining said actuator moving substantially at said predetermined velocity, the actuator is displaced more than 1 cm and less than 15 cm.

7. Method according to claim 2, wherein the electric motor is a servomotor.

8. Method according to claim 1, wherein during the step of thereafter maintaining said actuator moving substantially at said predetermined velocity, the actuator is displaced more than 1 cm.

9. Method according to claim 8, wherein during the step of thereafter maintaining said actuator moving substantially at said predetermined velocity, the actuator is displaced more than 2 cm.

10. Method according to claim 9, wherein during the step of thereafter maintaining said actuator moving substantially at said predetermined velocity, the actuator is displaced more than 3 cm.

11. Method according to claim 9, wherein during the step of thereafter maintaining said actuator moving substantially at said predetermined velocity, the actuator is displaced less than 15 cm.

12. Method according to claim 8, wherein during the step of thereafter maintaining said actuator moving substantially at said predetermined velocity, the actuator is displaced less than 15 cm.

13. Method according to claim 12, wherein during the step of thereafter maintaining said actuator moving substantially at said predetermined velocity, the actuator is displaced less than 10 cm.

14. Method according to claim 13, wherein during the step of thereafter maintaining said actuator moving substantially at said predetermined velocity, the actuator is displaced less than 8 cm.

15. Method according to claim 14, wherein during the step of thereafter maintaining said actuator moving substantially at said predetermined velocity, the actuator is displaced less than 6 cm.

16. Method according to claim 15, wherein during the step of thereafter maintaining said actuator moving substantially at said predetermined velocity, the actuator is displaced less than 5 cm.

17. Method according to claim 16, wherein during the step of thereafter maintaining said actuator moving substantially at said predetermined velocity, the actuator is displaced less than 4 cm.

18. Method according claim 8, wherein the electric motor is a servomotor.

19. Method according to claim 1, wherein during the step of thereafter maintaining said actuator moving substantially at said predetermined velocity, said actuator is displaced a sufficient distance to make sure that a part of the cracking process including a first and a second fracture, will take place while the actuator is being displaced at substantially the predetermined velocity.

20. Method according to claim 1, wherein the electric motor is a servomotor.

* * * * *